Dec. 19, 1922. 1,439,251

A. MALOUF.
DRINKING FOUNTAIN FOR POULTRY.
FILED JUNE 19, 1922.

Abraham Malouf
INVENTOR
by J. M. Thomas
ATTORNEY

Patented Dec. 19, 1922.

1,439,251

UNITED STATES PATENT OFFICE.

ABRAHAM MALOUF, OF SALT LAKE CITY, UTAH.

DRINKING FOUNTAIN FOR POULTRY.

Application filed June 19, 1922. Serial No. 569,430.

*To all whom it may concern:*

Be it known that I, ABRAHAM MALOUF, a citizen of the United States, residing at Salt Lake City, in the county of Salt Lake and State of Utah, have invented certain new and useful Improvements in Drinking Fountains for Poultry, of which the following is a specification.

My invention relates to watering fountains for poultry, and has for its object to provide an automatic watering fountain wherein a supply of clean water may be conveniently placed for drinking by small as well as large poultry, and with the further object of supplying a small trough and a limited amount of water in order that very small chickens may not be chilled by standing in the water or drowned therein and so constructed that any falling dirt or débris will be deflected away from the water supply. Another object is to provide an economical means to warm the water for use during cold weather.

These and other objects which will be apparent I accomplish with the device illustrated in the accompanying drawings in which similar letters and numerals of reference indicate like parts throughout the several views, and as described in the specification forming a part of this application and pointed out in the appended claims.

Figure 1:
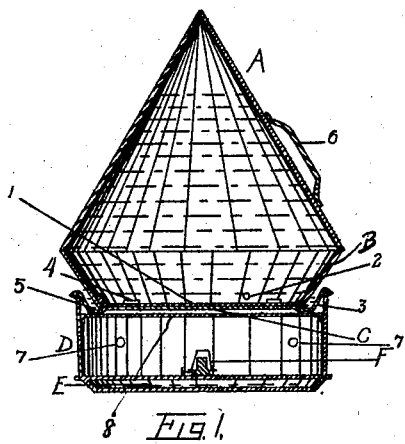
Figure 2:
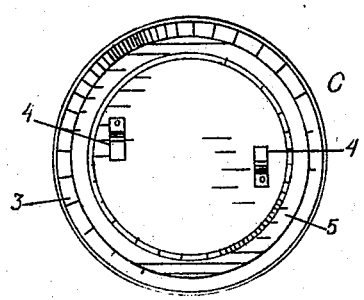
Figure 3:
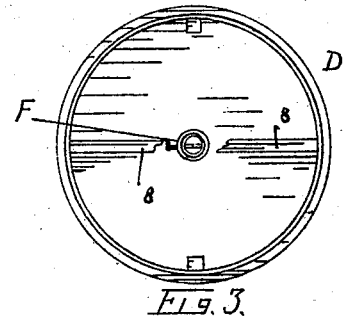
Figure 4:
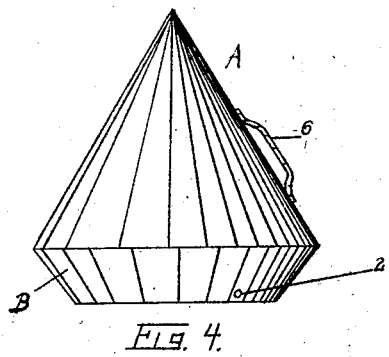
Figure 5:
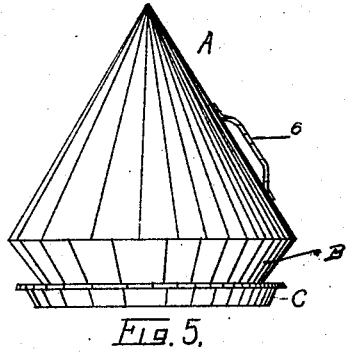

In the drawings in which I have shown a substantial embodiment of my invention, Figure 1 is a vertical diametrical section of the device. Figure 2 is a plan view of the trough pan. Figure 3 is a plan view of the base and lamp holding member. Figure 4 is an elevation of the water tank or container. Figure 5 is an elevation of the container and trough pan thereon.

The present invention consists of a cone-shaped container A with an inwardly tapered or inverted frusto-conically shaped lower portion as shown at B, which container has a closed top and open bottom, and diametrically across the bottom is secured the holding strap 1. The said container is preferably made of sheet metal, and I use galvanized iron as it will not rust and is cheap in construction. A hole 2 is punched in said lower portion B near its lower edge, the distance from the edge being determined by the depth of the water desired in the trough. The conical shape of the portion A will prevent the chickens from roosting on the container and such form will cause dirt to slide off of the container and away from the trough thus keeping the water clean. A bottom pan C with an upwardly and outwardly flanged side wall 3 is detachably held on said container by the clamping lugs 4 which are riveted to the bottom of said pan at one end and spaced from said pan at their other ends in order that they may be engaged with said holding strap 1 to fasten said pan as a closure for said container. The side wall 3 is higher than the hole 2 in the container and when water has escaped or flowed through said hole 2 sufficient to partially fill the trough to a depth above said hole the flow will be stopped. An annular trough or groove 5 is formed in the bottom of said pan C contiguous said side wall 3 and without the lower edge of the portion B of said container, this allows water to flow under the lower edge of said container and prevents dirt from impeding said flow. The outer edge of the said side wall 3 is smaller than the bottom of said cone A thereby preventing small chicks from getting into the water and drowning as the trough 5 is narrow and shallow. In warm weather and when the chicks are small the device may be used without the base or lamp portion, and during cold weather the pan C is placed within the base member D as a support. The lower portion of said base D is an oil tank or reservoir E, within which kerosene is provided for the burner F by which heat may be applied to the water in the trough 5, and a heat deflecting bar 8 is secured diametrically in said base D to deflect the heat more evenly to the pan C. Openings 7 are provided in the wall of said base for ventilation and through which to supply oxygen to the lamp or burner F. A handle 6 is fastened on the side of said container by which it may be turned with the open bottom upwardly for filling the container with water.

The operation of my device is as follows:—

The pan C is detached from the container by partially rotating it, thereby releasing the said lugs 4 from the holding strap 1 and with the container inverted it may be filled with water, and the pan is then fastened thereon by engaging the lugs 4 with the strap 1. When the container is righted with the point of the cone upward water will flow out of the hole 2 to partially fill the trough 5 and with the pan C horizontally placed on the ground the flow of water will cease when the water reaches above said hole 2.

When desired, heat from the burning oil of the lamp or burner F may be applied to warm the water in the pan C by resting the container and pan in the upper portion of the base D.

Having thus described my invention and its use I desire to secure by Letters Patent and claim:—

1. A drinking fountain for poultry comprising a container having a closed top and an open bottom which bottom portion is given an inverted frusto-conical shape having a hole in its side wall near the lower edge thereof; a diametrically disposed strap in said bottom portion; a pan having lugs secured to its bottom which engage with the said strap; a narrow shallow annular groove formed in the bottom of said pan; an upwardly and outwardly turned side wall on said pan higher than the hole in said frusto-conically shaped portion of said container and smaller than the largest periphery of said container.

2. A drinking fountain for poultry comprising a container having a cone-shaped upper portion and an inverted frusto-conically shaped lower portion with a hole therein near its bottom edge; a handle thereon to invert said container; a strap diametrically secured across the open bottom of said container; a pan having an outwardly flared side wall higher than the hole in said container wall; lugs in said pan to engage the said strap in said container to detachably fasten the pan on said container; a cup-shaped base member to support said container and pan; and means carried in said base member to apply heat under said pan.

In testimony whereof I have affixed my signature.

ABRAHAM MALOUF.